United States Patent [19]

Olper et al.

[11] Patent Number: 5,039,337

[45] Date of Patent: Aug. 13, 1991

[54] PROCESS FOR PRODUCING ELECTROLYTIC LEAD AND ELEMENTAL SULFUR FROM GALENA

[75] Inventors: Marco Olper, Monza; Pierluigi Fracchia, Milan, both of Italy

[73] Assignee: Engitec Impianti S.p.A., Milan, Italy

[21] Appl. No.: 559,140

[22] Filed: Jul. 30, 1990

[30] Foreign Application Priority Data

Jul. 31, 1989 [IT] Italy .................. 21393 A/89

[51] Int. Cl.$^5$ .................................. C22B 3/00
[52] U.S. Cl. .................................. 75/725
[58] Field of Search .................................. 75/725

[56] References Cited

U.S. PATENT DOCUMENTS

| | | | |
|---|---|---|---|
| 4,011,146 | 3/1977 | Coltrinari | 75/725 |
| 4,166,737 | 9/1979 | Demarthé | 75/725 |
| 4,610,722 | 9/1986 | Duyvesteyn | 75/725 |

*Primary Examiner*—Peter D. Rosenberg
*Attorney, Agent, or Firm*—Foley & Lardner

[57] ABSTRACT

A process for producing electrolytic lead and elemental sulfur from galena comprises the steps of leaching galena with an acidic aqueous solution of ferric fluoborate, with ferrous fluoborate, lead fluoborate, and elemental sulfur being formed according to the reaction:

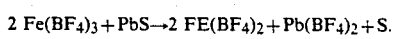

$$2\ Fe(BF_4)_3 + PbS \rightarrow 2\ FE(BF_4)_2 + Pb(BF_4)_2 + S.$$

In a further step, a solid residue produced in the leaching step is filtered off, the solid residue comprising elemental sulfur and galena gangue. The solution of ferrous fluoborate and lead fluoborate formed in the leaching step is subjected to electrolysis in a diaphragm electrolytic cell in which pure lead is deposited at a cathode of the cell and ferrous ions are oxidated to ferric ions at an anode of the cell. A solution of ferric fluoborate regenerated at the anode in the electrolysis step is recycled to the leaching step so that the solution is subjected to the galena leaching step.

8 Claims, 1 Drawing Sheet

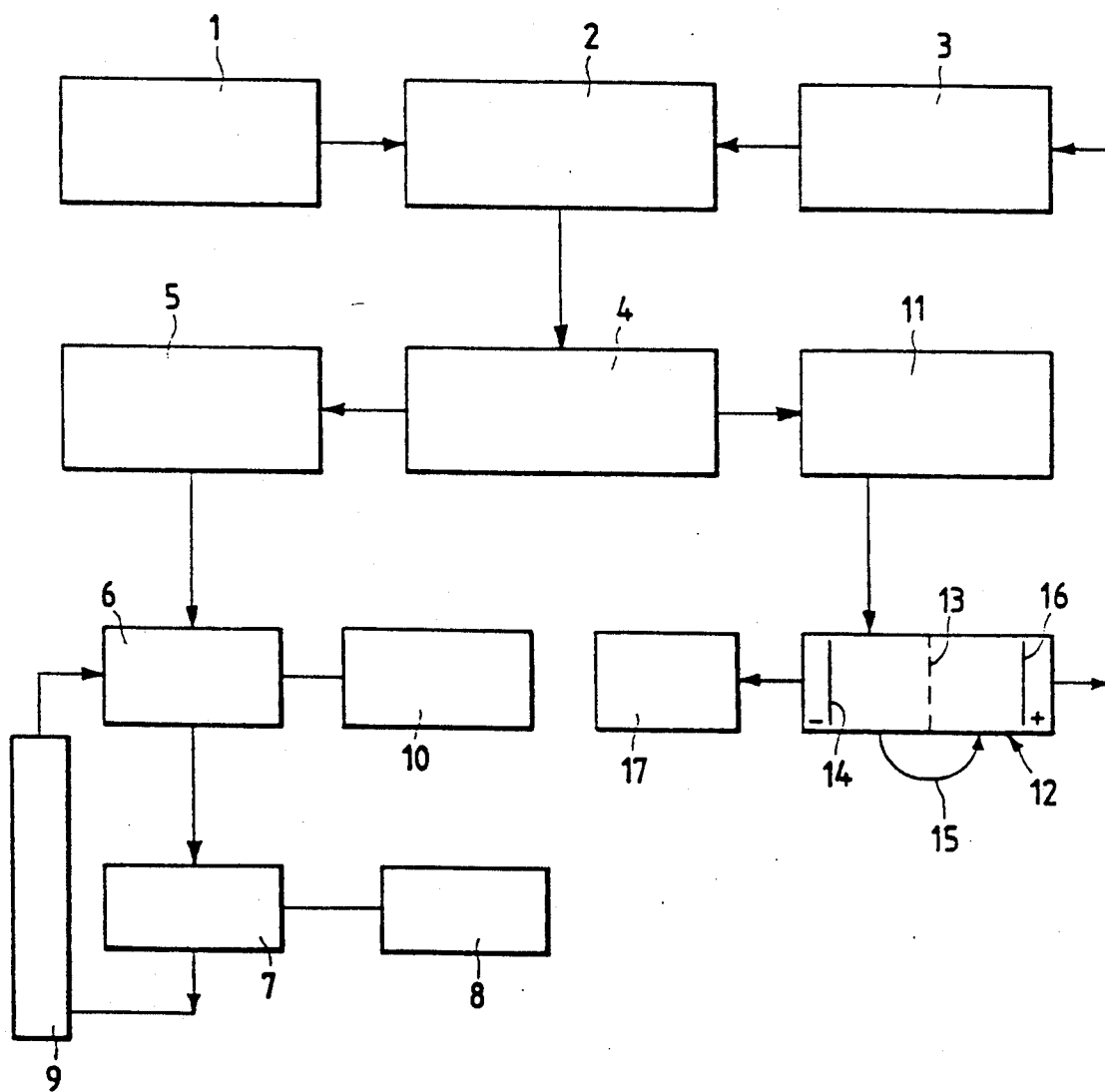

PROCESS FOR PRODUCING ELECTROLYTIC LEAD AND ELEMENTAL SULFUR FROM GALENA

BACKGROUND OF THE INVENTION

It is well-known that lead is usually produced from galena by a thermal way i.e., by means of roasting processes.

This production method involves a large number of problems, above all of the environmental type, owing to the emission of considerable amounts of dusts containing lead and sulfur dioxide into the atmosphere.

Another problem which begins to constitute a considerable burden which damages the budgets of the industry of the production of lead by extraction thereof from galena by the thermal way is the consequent production of sulfuric acid, which leads often to financial burdens and to general disadvantages.

Owing to these reasons, most experts in this sector agree upon expecting that in a near future the production of lead by the hydrometallurgical process will become competitive with the present production by thermal way.

In the relevant technical literature a very large number of papers exist, reporting about the studies and researches aiming at developing a hydrometallurgical process for producing lead from galena.

Suffice it to say that the first investigations carried out by Bequerel and Marchese in order to obtain sulfur and lead from galena by electrolysis date back to the second half of the nineteenth century. The thermodynamic and kinematic parameters of the reaction of dissolution of lead in an electrolyte and production of elemental sulfur were subsequently investigated into greater details by a large number of researchers.

The oxidating means which is by far the most studied one, is, still to-day, ferric chloride.

With this reactant, during the past years the two most advanced processes for the hydrometallurgical processing of galena were developed, and precisely the Minimet Penarroya process and the U.S. Bureau of Mines (USBM) process.

In both of these methods, a leaching of galena in an aqueous solution of ferric chloride with NaCl is carried out first, then the sulfur-containing residue is filtered off, and the so obtained lead chloride is electrolysed.

It is in this latter operation that the two processes are different from each other, because according to the Minimet process, the solution is submitted to electrolysis after being purified, with spongy lead being obtained, whilst according to the USBM process $PbCl_2$ is crystallized and is then submitted to electrolysis in a bath of molten chlorides.

However, also the use of hydrometallurgy which chloride leaching is affected by drawbacks which derive from the specific characteristics of chloride ion, i.e.;
* low solubility of lead chloride in water; hence, the need of adding such salts as NaCl or, in general, alkali and alkali-earth metal chlorides, which, as well-known, increase the solubility of the metals by forming the $Cl_4$ - complex ion.

The complex chloride, although is beneficial to the solubility of lead, causes the dissolving of nobler metals such as Bi, Ag and Cu, so that these latter metals are subdivided between the residue and the solution in a difficultly foreseeable way.

* Also in case such a contrivance is adopted, the leaching solutions can dissolve not more than 25–30 g of Pb** per liter. Therefore a "galena/solution" ratio equal or lower than 1:20 required.

* The electrolysis of lead chloride in an aqueous solution does not yield a compact deposit; on the contrary, lead is recovered as an incoherent sponge. The electrolytic cell must have a very complex structure in order to collect the product which falls to the bottom, and remains impregnated with electrolyte.

In general, from the smelting of the lead sponge obtained from the electrolysis, a lead with a purity of 99.99% is obtained, unless the electrolyte is submitted to a preliminary, laborious purification.

* the smelting of the lead sponge, owing to its high oxidability, is a delicate operation, to be carried out under a flux (NaOH), and causes the production of at least 5% of oxidation slags.

The electrolysis of lead chloride in a molten electrolytic bath is much more complex, is not safe from the environmental viewpoint, consumes a larger amount of energy and the produced lead does not have a purity of 99.99%.

SUMMARY OF THE INVENTION

According to the instant invention, the present Applicant has surprisingly found now that the problems which affect the prior art, as hereinabove briefly stated, can be efficaciously overcome by means of a process for producing electrolytic lead and elemental sulfur from galena, characterized in that it comprises the following steps:

(a) Galena is leached with an acidic aqueous solution of ferric fluoborate, with ferrous fluoborate, lead fluoborate and elemental sulfur being formed according to the reaction:

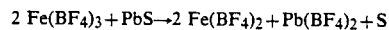

$2\ Fe(BF_4)_3 + PbS \rightarrow 2\ Fe(BF_4)_2 + Pb(BF_4)_2 + S$ (b) the solid residue, composed by elemental sulfur and galena gangue is filtered off;

(c) the solution of ferrous fluoborate and lead fluoborate coming from the (a) step is sent to a diaphragm electrolytic cell, wherein pure lead is deposited at the cathode and at the anode ferrous ion is oxidated to ferric ion;

(d) the solution of ferric fluoborate regenerated at the anode in said (c) step is recycled to said (a) step of galena leaching.

BRIEF DESCRIPTION OF THE DRAWING

In order to better understand characteristics and advantages of the process according to the present invention, in the following a non-limitative, examplifying form of a practical embodiment thereof is disclosed, by referring to the figure of the hereto attached drawing, which represents a block diagram of the same process.

DETAILED DESCRIPTION

Galena as a concentrate, is sent from 1 to a leaching vat in an initial step 2, to which an aqueous solution of ferric fluoborate is fed in a preliminary step 3.

In the step 2, the following reaction takes then place:

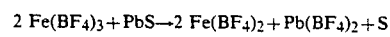

$2\ Fe(BF_4)_3 + PbS \rightarrow 2\ Fe(BF_4)_2 + Pb(BF_4)_2 + S$

The pH value is lower than 1, the temperature is preferably comprised within the range of from 80 to 100° C., the reaction time is comprised within the range of from 15 minutes to 4 hours, according to the type of galena and its granulometry.

When the reaction is ended, the solution coming from 2 is filtered in step 4, yielding an undissolved residue constituted by elemental sulfur and by the gangue of the ore used as the raw material, which generally contains Cu, Zn and precious metals.

Such an undissolved residue can be advantageously recovered by being subjected to to a step 6 wherein sulfur is extracted from the gangue with a solvent, such as carbon disulfide, or by flotation.

The sulfur solution is then distilled in step 7, and pure sulfur 8, not containing metals, is obtained. In the herein exemplified flow diagram, the recycling of the condensates from the distillation step, from the step 7 to the step 6, is indicated by the reference numeral 9. From the extraction step 6, a solid residue comprising the metals (Cu, Zn, precious metals) is also recovered.

From the filtration step 4, an aqueous solution of lead-(II) and iron-(II) fluoborates is obtained at step 11 and is sent to a diaphragm electrolytic cell 12, schematically shown and indicated by the reference numeral 13.

In this latter step, at the cathode 14, pure lead 17 deposits, and the solution, partially deprived of lead, is sent through the route 15 to the anodic compartment 16, wherein the oxidation of ferrous fluoborate to ferric fluoborate takes place.

The so regenerated solution of ferric ion is recycled from the electrolytic cell 12 to the leaching vat and undergoes step 2 wherein the attack of further galena takes place.

A further example of a practical embodiment of the present invention, in which particular reference to the amounts of the involved substances is made, is reported in the following example. Also in this case, in no way should be example be construed as being limitative of the invention.

EXAMPLE 112 g of galena concentrate, having the composition:

| | |
|---|---|
| Pb | 78% |
| Zn | 1.1% |
| Cu | 0.9% |
| Fe | 2.2% |
| Mg | 0.04% |
| S | 14.97% | is gradually added with stirring to 1.6 liters of a solution containing 28 g/l of Fe (as fluoborate), 32 g/l of Fe* (as fluoborate), 20 g/l of Pb** (as fluoborate).

After 4 hours of reaction at 105° C., the reaction solution is filtered and:
  24 g of insoluble residue containing 23.3% of Pb, 4.5% of Zn and 3.9% of Cu;
  as well as 1.6 l of solution containing 86.5 g/l of Pb (as fluoborate), 58 g/l of Fe (as fluoborate), 2 g/l of Fe* (as fluoborate), 0.11 g/l of Zn (as fluoborate), 0.02 g/l of Cu** (as fluoborate), are obtained.

The lead-containing solution, after being cemented with Pb powder in order to remove any copper traces, is circulated between the anodic compartment of a diaphragm electrolytic cell, the cathode of which is constituted by a stainless-steel plate and the anode is a grid of activated tantalum.

Under the action of a direct current at 3.0 V, which maintains a current density of 300 A/mz at the cathode, the following processes take respectively place:
  * at the cathode: Pb is deposited in a compact, smooth form;
  * at the anode: Fe is oxidated to Fe*.

At the end of the process: 98 g of cathodic lead with a purity of 99.99% and 1.6 l of an electrolyte containing 24 g/l of Pb, 35 g/l of Fe* and 25 g/l of Fe**, are obtained.

This electrolyte will be used for the successive operation of leaching of galena concentrate.

The residue obtained from the leaching was treated with carbon disulfide in order to extract sulfur.

After distilling off the solvent, 12.5 g of elemental sulfur without any traces of metals was obtained.

From the above, as disclosed and exemplified, one can see how the process proposed according to the present invention makes it possible for electrolytic lead and elemental sulfur to be produced simultaneously, without falling into the problems which affect the prior art, as discussed hereinabove.

The solution of ferric fluoborate used in the leaching step is capable of yielding a very soluble lead salt, very stable to the expected reaction temperatures.

A further, important, feature of the process according to the present invention is the selectivity of the leaching in respect of the metals and of the precious metals which are contained in galena together with lead. According to the present invention, it has been seen that galena has a cementing effect as regards the nobler metals than lead (Cu, Ag, Bi, and so forth) in a fluoboric medium in the presence of Fe**.

In fact, the following reactions take place:

$$PbS + Cu(BF_4)_2 \rightarrow Pb(BF_4)_2 + Cu + S^0$$

$$PbS + 2\,Ag(BF_4) \rightarrow Pb(BF_4)_2 + 2\,Ag + S^0$$

$$3\,PbS + 2\,Bi(BF_4)_3 \rightarrow 3\,Pb(BF_4)_2 + 2\,Bi + 3\,S^0$$

Therefore, the purification of the solution takes place directly during the leaching step, if this latter step is carried out with a slight excess of galena over the stoichiometric amount.

The so producted lead has hence a purity of 99.99%. According to the process of the instant invention, lead can be deposited in a compact form, even with low end lead contents in the solution at high values of current density, owing to the simultaneous presence of Fe(BF$_4$)$_2$, which exerts a beneficial action on the deposit.

The deposit of pure lead at the cathode is of an extremely high quality.

A further advantage of the process according to the instant finding is that one can operate in the electrolytic deposition step at a high value of cathodic current density, with a high deposition efficiency.

A considerable advantage offered by the instant invention is that the fluoboric solution can be used again by being directly recycled from the electrolytic cell to the leaching step, without having to undergo a preliminary purification step.

Thus, as one can realize from all of the features of the process as disclosed hereinabove, all of the problems which affect the processes known from the prior art are advantageously overcome.

We claim:

1. A process for producing electrolytic lead and elemental sulfur from galena, said method comprising the steps of:
    (A) leaching galena with an acidic aqueous solution of ferric fluoborate, with ferrous fluoborate, lead fluoborate, and elemental sulfur being formed according to the reaction:

$$2\ Fe(BF_4)_3 + PbS \rightarrow 2\ Fe(BF_4) + Pb(BF_4)_2 + S;$$

(B) filtering off a solid residue produced in said step (A), said solid residue comprising elemental sulfur and galena gangue;
    (C) subjecting a solution of ferrous fluoborate and lead fluoborate formed in said step (A) to electrolysis in a diaphragm electrolytic cell in which pure lead is deposited at a cathode of said cell and ferrous ions are oxidated to ferric ions at an anode of said cell; and
    (D) recycling a solution of ferric fluorborate regenerated at the anode in said step (C) to said step (A) so that said solution takes part in said galena leaching step.

2. A process according to claim 1, wherein said step (A) is carried out at a pH value of less than 1 and at a temperature of at least 80° C.

3. A process according to claim 1, wherein said step (A) comprises the step of leaching galena having small amounts of at last one of Cu, Ag, Bi, and wherein at least one of the following reactions takes place in said step (A).

$$PbS + Cu(BF_4)_2 \rightarrow Pb(BF_4)_2 + Cu + S^0$$

$$PbS + 2\ Ag(BF_4) \rightarrow Pb(BF_4)_2 + 2\ Ag + S^0$$

$$3\ PbS + 2\ Bi(BF_4)_3 \rightarrow 3\ Pb(BF_4)_2 + 2\ Bi + 3\ S^0.$$

4. A process according to claim 1, further comprising the step of treating said solution of lead fluoborate and ferric fluoborate formed in said step (A) with lead powder before subjecting said solution to said step (C).

5. A process according to claim 1, further comprising the step of subjecting said solid residue filtered off in said step (B) to a recovery treatment.

6. A process according to claim 5, wherein said step of subjecting said solid residue to a recovery treatment comprises the steps of
    extracting sulfur from said gangue with a solvent, and then
    distilling said solvent to obtain pure sulfur.

7. A process according to claim 5, wherein said recovery treatment step comprises the step of removing sulfur from said residue via flotation.

8. A process for producing electrolytic lead and elemental sulfur from galena, said method consisting essentially of the following steps:
    (A) leaching galena with an acidic aqueous solution of ferric fluoborate, with ferrous fluoborate, lead fluoborate, and elemental sulfur being formed according to the reaction:

$$2\ Fe(BF_4)_3 + PbS \rightarrow 2\ Fe(BF_4)_2 + Pb(BF_4)_2 + S;$$

(B) filtering off a solid residue produced in said step (A), said solid residue comprising elemental sulfur and galena gangue;
    (C) subjecting a solution of ferrous fluoborate and lead fluoborate formed in said step (A) to electrolysis in a diaphragm electrolytic cell in which pure lead is deposited at a cathode of said cell and ferrous ions are oxidated to ferric ions at an anode of said cell; and
    (D) recycling a solution of ferric fluoborate regenerated at the anode in said step (C) to said step (A) so that said solution takes part in said galena leaching step.

* * * * *